United States Patent
Sahita et al.

(10) Patent No.: US 9,858,411 B2
(45) Date of Patent: Jan. 2, 2018

(54) EXECUTION PROFILING MECHANISM

(71) Applicants: Ravi Sahita, Beaverton, OR (US); Xiaoning Li, Santa Clara, CA (US); Barry E. Huntley, Hillsboro, OR (US); Ofer Levy, Atlit (IL); Vedvyas Shanbhogue, Austin, TX (US); Yuriy Bulygin, Beaverton, OR (US); Ido Ouziel, Carmel (IL); Michael Lemay, Hillsboro, OR (US); John M. Esper, Austin, TX (US)

(72) Inventors: Ravi Sahita, Beaverton, OR (US); Xiaoning Li, Santa Clara, CA (US); Barry E. Huntley, Hillsboro, OR (US); Ofer Levy, Atlit (IL); Vedvyas Shanbhogue, Austin, TX (US); Yuriy Bulygin, Beaverton, OR (US); Ido Ouziel, Carmel (IL); Michael Lemay, Hillsboro, OR (US); John M. Esper, Austin, TX (US)

(73) Assignee: INTEL CORPORATION, Santa Clara, CA (US)

( * ) Notice: Subject to any disclaimer, the term of this patent is extended or adjusted under 35 U.S.C. 154(b) by 186 days.

(21) Appl. No.: 14/576,665

(22) Filed: Dec. 19, 2014

(65) Prior Publication Data

US 2016/0180079 A1 Jun. 23, 2016

(51) Int. Cl.
| | |
|---|---|
| G06F 9/45 | (2006.01) |
| G06F 21/52 | (2013.01) |
| G06F 21/55 | (2013.01) |
| G06F 9/455 | (2006.01) |
| G06F 11/30 | (2006.01) |

(52) U.S. Cl.
CPC .......... *G06F 21/52* (2013.01); *G06F 9/45558* (2013.01); *G06F 11/30* (2013.01); *G06F 21/554* (2013.01); *G06F 2009/45591* (2013.01); *G06F 2221/033* (2013.01)

(58) Field of Classification Search
None
See application file for complete search history.

(56) References Cited

U.S. PATENT DOCUMENTS 5,592,664 A * 1/1997 Starkey ............ G06F 17/30067

\* cited by examiner

*Primary Examiner* — Chuck Kendall
(74) *Attorney, Agent, or Firm* — Blakely, Sokoloff, Taylor & Zafman LLP

(57) ABSTRACT

A method comprises filtering branch trap events at a branch event filter, monitoring a branch event filter to capture indirect branch trap events that cause a control flow trap exception, receiving the indirect branch trap events at a handler and the handler processing the indirect branch trap events.

25 Claims, 4 Drawing Sheets

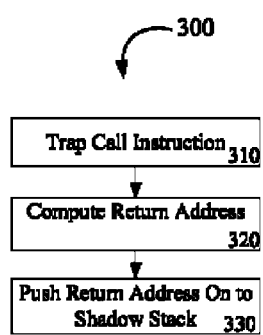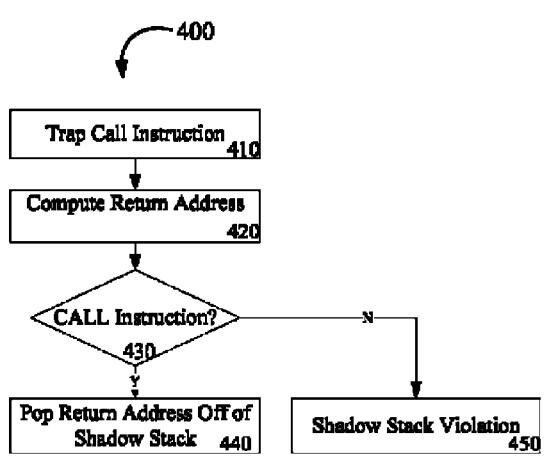
FIG. 3
FIG. 4

EXECUTION PROFILING MECHANISM

FIELD

Embodiments described herein generally relate to device security. More particularly, embodiments relate to enhancing security against malware.

Electronic security has evolved into a more prominent concern as people are increasingly conducting personal and/or confidential transactions electronically. In addition, hackers and/or others with malicious intent are becoming increasingly more creative in circumventing existing security measures in devices. To combat evolving and pervasive incursions by malware and/or viruses, equipment and/or software manufacturers are continuing to make protection measures more intrinsic to the hardware of new devices. For example, in response to situations wherein foreign code is injected into programs to steal information from, or even take over control of, a device, new protection schemes including non-executable memory segments are implemented. These security provisions allow programs to be authenticated and even for certain vulnerable code to be marked as non-executable at the hardware level. For example, attempts to inject foreign code or to execute protected code would cause hardware control resources in a processor such as a hypervisor to intervene to protect the integrity of the system.

However, enterprising attackers have figured out a way to circumvent these protections in order to perform malicious control flow attacks. For example, in return-oriented programming (ROP) an attacker may hijack the control flow of software to access certain program functions (e.g., gadgets). A gadget may, in general, comprise a set of program instructions. For example, gadgets may include portions of programs that may support rudimentary functionality essential to program operation (e.g., reading data, writing data, mathematical operations, etc.). When executed in the manner, sequence, etc. intended by programmers of beneficial software, gadgets have no ill effect on a device operation. However, upon wresting control of the control flow in a device, it is possible for gadgets to be manipulated (e.g., to be invoked in different sequences, with different arguments, etc.) to result in operations totally different from what was originally intended, and that may be able to overcome existing protection schemes. Currently proposed security measures to protect against malicious control flow attacks require either recompilation of the target software to introduce new instructions to track control flow or require full binary translation to detect violations, or detecting unintended control flow heuristically using hardware events.

BRIEF DESCRIPTION OF THE DRAWINGS

Embodiments are illustrated by way of example, and not by way of limitation, in the figures of the accompanying drawings in which like reference numerals refer to similar elements.

FIG. 3 is a flow diagram illustrating one embodiment of a process for handling a call instruction;

FIG. 4 is a flow diagram illustrating one embodiment of a process for handling a return instruction.

DETAILED DESCRIPTION

Figure 1:
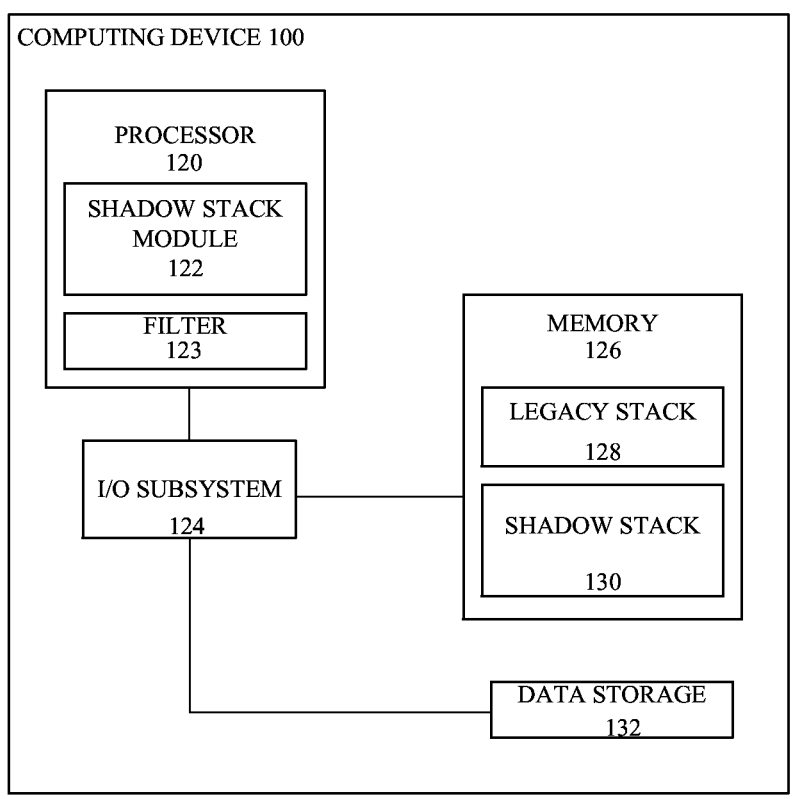
FIG. 1 is a block diagram illustrating one embodiment of a computing device for shadow stack support for legacy guests.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates one embodiment of a computing device 100. Computing device 100 includes a processor 120 having one or more filters. In one embodiment, the filters facilitate processor execution profiling, which enables monitoring of indirect branches without requiring recompilation. In such an embodiment, the filter removes un-interesting branch events and invokes pre-process monitoring software to detect untrusted/non-white-listed code being executed in a process address space, as well as detect when control flow is violated via zero-day exploits. In another embodiment, relevant branch events trapped by the filters are used to maintain and check a shadow stack that is not accessible by software.

The computing device 100 may be embodied as any type of device capable of providing control flow monitoring and otherwise performing the functions described herein. For example, the computing device 100 may be embodied as, without limitation, a computer, a desktop computer, a workstation, a server computer, a laptop computer, a notebook computer, a tablet computer, a smartphone, a mobile computing device, a wearable computing device, a distributed computing system, a multiprocessor system, a consumer electronic device, a smart appliance, and/or any other computing device capable of providing shadow stack support.

As shown in FIG. 1, the illustrative computing device 100 includes the processor 120, an I/O subsystem 124, a memory 126, and a data storage device 132. However, computing device 100 may include other or additional components, such as those commonly found in a computer (e.g., various input/output devices), in other embodiments. Additionally, in some embodiments, one or more of the illustrative components may be incorporated in, or otherwise form a portion of, another component. For example, memory 126, or portions thereof, may be incorporated in processor 120 in some embodiments.

Processor 120 may be embodied as any type of processor capable of performing the functions described herein. For example, processor 120 may be embodied as a single or multi-core processor(s), digital signal processor, microcontroller, or other processor or processing/controlling circuit. In one embodiment, processor 120 includes shadow stack module 122. Shadow stack module 122 may be embodied as any hardware, microcode, firmware, or other components of processor 120 capable of maintaining a shadow stack, monitoring a legacy stack, and/or generating virtual machine exits. As further described below, shadow stack module 122 may include processor instructions (e.g., a call instruction and a return instruction) that maintain the shadow stack and monitor the legacy stack. Shadow stack module 122 may also be capable of generating virtual machine exits in response to stack-related events, such as stack out-of-bounds events or stack return address mismatch events. Shadow stack module 122 may also be selectively enabled or disabled, for example by enabling a stack monitoring mode.

Filter 123 performs branch event filtering that enables branch monitoring by removing un-interesting branch events to enable detection and capture of branch events that may comprise untrusted code being executed at processor 120. Memory 126 may be embodied as any type of volatile or non-volatile memory or data storage capable of performing the functions described herein. In operation, memory 126 may store various data and software used during operation of computing device 100 such operating systems, applications, programs, libraries, and drivers. In particular, memory 126 includes a legacy stack 128 and a shadow stack area 130.

Memory 126 is communicatively coupled to processor 120 via an I/O subsystem 124, which may be embodied as circuitry and/or components to facilitate input/output operations with processor 120, memory 126, and other components of computing device 100. For example, I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, I/O subsystem 124 may form a portion of a system-on-a-chip (SoC) and be incorporated, along with processor 120, memory 126, and other components of computing device 100, on a single integrated circuit chip.

A data storage device 132 may be embodied as any type of device or devices configured for short-term or long-term storage of data such as, for example, memory devices and circuits, memory cards, hard disk drives, solid-state drives, or other data storage devices.

Figure 2:
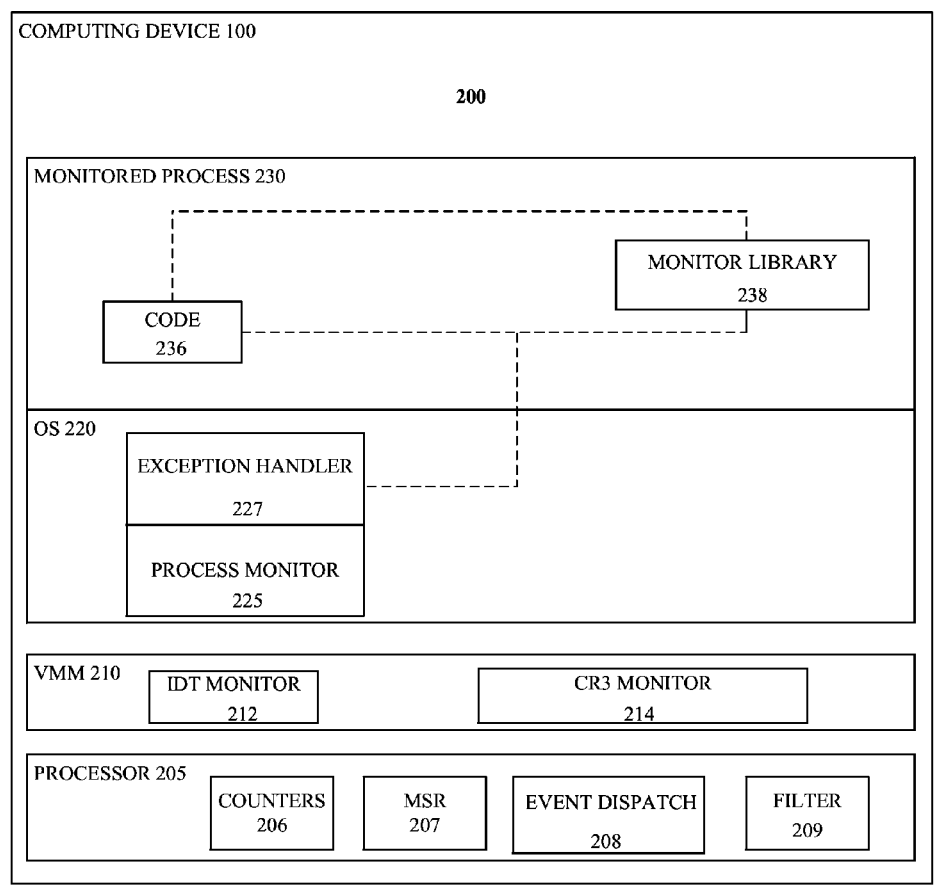
FIG. 2 is a block diagram illustrating one embodiment of an environment of a computing device.

FIG. 2 illustrates one embodiment of an environment 200 established during operation of computing device 100. The various modules of the environment 200 may be embodied as hardware, firmware, software, or a combination thereof. For example the various modules, logic, and other components of the environment 200 may form a portion of, or otherwise be established by, the processor 120 or other hardware components of the computing device 100.

The illustrative embodiment 200 includes a processor 205. Processor 205 includes an event dispatch module 208 and a filter 209. Filter 209 is a filter having event branch event filtering capability. In one embodiment, filter 209 is programmed via a processor 205 model-specific register (MSR) 207 to enable branch trap events to be filtered by processor 205 without pipeline flushes or performance sideeffects. In such an embodiment, filter 209 enables monitoring software to select branch types that cause a control flow trap exception, or invocation of a protection ring-3 handler. Upon determining a match, filter 209 reports a branch via a protection ring-0 exception (e.g., #DB trap or other). Table 1 specifies one embodiment of branch event filter criteria implemented at filter 209. Once enabled, filter 209 generates a debug exception after applying the filter criteria specified by software.

TABLE 1

| Bit Field | Bit Offset | Access | Description |
| --- | --- | --- | --- |
| CPL_EQ_0 | 0 | R/W | When set do not capture branches occurring in ring 0 |
| CPL_NEQ_0 | 1 | R/W | When set do not capture branches occuring in ring >0 |
| JCC | 2 | R/W | When set do not capture conditional branches |
| NEAR_REL_CALL | 3 | R/W | When set do not capture near relative calls |
| NEAR_IND_CALL | 4 | R/W | When set do not capture near indirect calls |
| NEAR_RET | 5 | R/W | When set do not capture near returns |
| NEAR_IND_JMP | 6 | R/W | When set do not capture near indirect jumps except near indirect calls and near returns |
| NEAR_REL_JMP | 7 | R/W | When set do not capture near relative jumps except near relative calls. |
| FAR_BRANCH | 8 | R/W | When set do not capture for branches |

According to one embodiment, filter 209 also implements return mis-predict filter control that permits ring-0 software to configure branch events only for mis-predicted returns, rather than all returns. Additionally processor 205 includes a counter 206 for matched returns that are not reported. In one embodiment, this capability is enabled via a new bit control in filter 209 shown in Table 1.

According to one embodiment, filter 209 is implemented via a branch trap flag (BTF) with a hardware BTF filter. In other embodiments, filter 209 may be implemented using a new branch trace message (BTM_SELECT) filter component of Trace Messages (TR) that is programmatically exposed via MSR 207. In such an embodiment, filter 209 is enables by a BTM_SELECT bit. An IA32_DEBUGCTL MSR provides bit field controls to enable BTF and/or TR and is located at register address 0x01D9. When set, a BTF (single-step on branches) flag (bit 1) causes processor 205 to treat the TF flag (TF) in the EFLAGS register as a "trap on branches" flag rather than a trap on every instruction flag, which allows single-stepping processor 205 on taken branches. When software sets both the BTF flag (bit 1) in the IA32_DEBUGCTL MSR and the TF flag in the EFLAGS register, processor 205 generates a debug exception (#DB) only after instructions that cause a branch. This mechanism allows an exception handler to single-step on control transfers caused by branches. In one embodiment, processor 205 clears TF upon generating a debug exception.

In one embodiment, processor 205 includes ring-3 handler MSR that allows ring-0 software to configure a process specific handler that can monitor the indirect branch events. If this MSR is programmed and enabled, filter 209 can invoke the process specific monitor via a near jump to the handler (e.g., with the FROM_IP and TO_IP and RFLAGS on the user stack). In optional embodiments, environment 200 features a virtual machine monitor (VMM) (or hypervisor) 210. VMM 210 includes an interrupt descriptor table (IDT) monitor 212 that monitors an interrupt vector table implemented by an IDT in order to determine response to interrupts and exceptions. VMM 210 also includes a control register 3 (CR3) monitor 214 that monitors linear addresses into physical address translations.

According to one embodiment, BTF capability may be enabled by VMM 210 such that all processes are not subject to BTF DB exceptions. Thus VMM 210 enables policy enforcement for specific processes (with an event handler being loaded into the particular processes). In a further embodiment, VMM 210 may handle an event completely internally by enabling exception exiting through a virtual machine control structure (VMCS) for the branch exception vector (#DB), or some new vector.

According to one embodiment, environment 200 also includes an operating system (OS) 220. OS 220 is implemented to enable branch filtering at filter 209 via MSR 207. OS 20 includes a process monitor 225 and exception handler 227. Process monitor 225 is a kernel driver that monitors process loads (and unloads) and captures a process state (e.g., CR3). In one embodiment, process monitor 225 activates branch monitoring when a monitored process is activated by OS 225. In embodiments that implement VMM 210, process monitor 225 interfaces with VMM 210 to track CR3 loads and toggle a branch monitoring state when monitored processes are active and switch a branch. As discussed above, VMM 210 is optional since the filter 209 state may be context switched via XSAVE state bits by OS 225.

Exception handler 227 is a ring-0 exception handler that filters control flow exceptions due to branch monitoring while the monitored process is active (e.g., CR3 matching is done by the exception handler 227). In one embodiment, event handler 227 also compares branch state (e.g., ring-3 stack state (saved on the exception frame)). In a further embodiment, handler 227 may dispatch to the ring-3 event handler by modifying the execution point on the exception stack and resuming the process (via an interrupt return D (IRETD)). Exception handler 227 may dispatch with additional context on the stack that the ring-3 event handler consumes. In an alternative embodiment, processor 205 can invoke the ring-3 handler directly if the ring-3 handler MSR is configured by ring-0 software.

Monitored process (e.g., application) 230 is a ring-3 component that includes executable code 236 and monitor library 238. Monitor library 208 is a dynamic link library (dll) that monitors branch events and operates as the ring-3 event handler. In one embodiment, monitor library 238 is loaded when the process is loaded. Alternatively, monitor library 238 may be loaded by process monitor 225. During runtime, monitor library 238 is invoked by the processor 205 for every monitored branch in the process context and executes synchronously via a near jump programmed via MSR (or XSAVE state for branch monitoring state), as described above. In one embodiment, processor 205 disables TF in the EFLAGS register during dispatch to monitor library 238, thus muting nested events. As discussed above, monitor library 238 resumes a process thread at code 236 that was interrupted due to the branch event via a user-level IRET, which enables TF.

Embodiments provide for security considerations implemented for the above-described mechanism. Specifically, TF must be protected from discovery. In one embodiment, enabling filter 209 makes TF in the EFLAGS register sticky. Additionally, malware detection of the TF-enabled state should be blocked. In one embodiment, if filter 209 is enabled a monitored process 230 (or ring-3) PUSHF instruction receives TF as disabled. Further, a ring-3 POPF instruction cannot disable TF (but can enable it), and the IRET instruction cannot disable TF (but can enable it). However, if filter 209 is enabled when TF is enabled, TF is treated as a special system flag and cannot be disabled by the above-described ring-3 instructions. In another embodiment, TF is left as is so that monitored process 230 views TF as being as disabled, and a shadow TF state is enabled by filter 209 enable control (e.g., OS 220 (or ring-0) observes the shadow or the ring-3 TF flag state).

In other embodiments the mechanism implements various policies. In one embodiment, Call/Jump indirect instructions land on expected export points and address spaces are checked for execution from unexpected memory. In a further embodiment, return instructions land on call sites and sensitive instructions (e.g., xchg esp, etc.). Further, successive RSB-missed gadgets are captured, which will need to be decoded.

Branch Trap Flag Shadow Stack

ROP, and Jump-Oriented Programming (JOP), often involve adversaries making use of unauthorized indirect branch targets, or authorized branch targets ordered in an unauthorized way. A variety of approaches have been proposed for detecting such behavior. One approach is implemented via shadow stack-based techniques, which are less prone to false positives and negatives than other approaches.

According to one embodiment, filters 209 filters out all branch instructions other than call and return instructions. Subsequently, the call and return instructions may be handled at ring-0 (exception handler 227) or ring-3 (e.g., monitor library 238) handler. In one embodiment, the handler uses information regarding relevant branches to maintain and check shadow stack 130. In such an embodiment, shadow stack 130 maintains a copy of legacy stack 128 that is inaccessible to ordinary software, and may be used to determine if the legacy stack has been tampered with by malware. Thus, shadow stack 130 is a stack area that is not accessible by ring-3 software in order to provide some level of protection against ROP and JOP exploits.

In one embodiment, legacy stack 128 is established by software, and may include stack contents, such as return addresses and automatic variables stored on the stack, as well as metadata such as a legacy stack pointer and/or a stack base pointer. In some embodiments, certain data, such as the legacy stack pointer, may be stored in one or more hardware registers of the processor 120.

In a further embodiment, shadow stack module 122 within processor 120 is configured to manage shadow stack 130, including associated metadata. In embodiments that implement VMM 210, the shadow stack 130 may include multiple stacks used to store the contents of one or more shadow stacks. In such embodiments, each shadow stack may be associated with a single software thread. Stack record metadata may be used to store a number of stack records, with each stack record associated with a corresponding shadow stack and legacy stack. For example, each stack record may include a shadow stack pointer, stack bounds, or other metadata such as security counters or a stack hazardous flag. At runtime, the shadow stack storage and the stack record metadata are stored in memory 126 that may not be accessed by software.

According to one embodiment, the filter 209 distinguishes call and return instructions by checking values of two performance counters at counters 206 (e.g., one to count returns and one to count calls). In a further embodiment, the filter 209 saves their current values prior to resumption of filtering. Thus, filter 209 is able to determine which counter has been incremented. Further, filter 209 may read each counter twice (e.g., once at the beginning and once at the end) to exclude branches, and may compensate for other branches that occur when entering or exiting filtering. Additionally, filter 209 implements the counters to monitor a number of executed call and return instructions In one embodiment, a handler (either ring-0 or ring-3) accesses shadow stack 130 during execution of call instruction and return instructions. FIG. 3 is a flow diagram illustrating one embodiment of a process 300 for handling a call instruction. Process 300 may be performed by processing logic that may comprise hardware (e.g., circuitry, dedicated logic, programmable logic, etc.), software (such as instructions run on a processing device), or a combination thereof. Process 300 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1 and 2 may not be discussed or repeated here.

Process 300 begins at processing block 310 with a call instruction being trapped at filter 209. In embodiments that implement VMM 210, a stack pointer is checked to select a corresponding shadow stack to perform subsequent operations. At processing block 320, a ring-0 or ring-3 handler computes a return address using instruction decoding. However in other embodiments, the return address may be computed by retrieving a last branch record (LBR). At processing block 330, the computed return address is pushed onto shadow stack 130.

FIG. 4 is a flow diagram illustrating one embodiment of a process 300 for handling a return instruction. Process 400 may be performed by processing logic that may comprise hardware (e.g., circuitry, dedicated logic, programmable logic, etc.), software (such as instructions run on a processing device), or a combination thereof. Process 400 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1 and 2 may not be discussed or repeated here.

Process 400 begins at processing block 410 with a call instruction being trapped at filter 209. As discussed above, embodiments that implement VMM 210 checks a stack pointer to select a corresponding shadow stack to perform subsequent operations. At processing block 420, a ring-0 or ring-3 handler computes a return address using instruction decoding or by retrieving a LBR. At processing block 430, a handler compares a return address of shadow stack 130 to an return address of legacy stack 128 to determine if there is a match. In other embodiments, a legacy stack pointer value from shadow stack may be compared to a current legacy stack pointer value. If a match is detected, a return address is popped off of shadow stack 130 and used for execution, processing block 440. If no match is detected, a shadow stack violation is triggered, processing block 450.

According to one embodiment, a mismatch handler may be implemented upon detecting a shadow stack violation. In such an embodiment, the mismatch handler determines whether the stack mismatch was likely caused by a malicious ROP or JOP exploit or by legitimate software. Further, the mismatch handler may be configured to handle a suspected exploit, for example by terminating the software. In virtual machine embodiments a virtual machine may be exited upon determining a shadow stack violation, resulting in the mismatch handler terminating the violating software thread, and allowing legitimate software to continue, for example by resuming a guest virtual machine.

According to one embodiment, a ring-0 or ring-3 handler may identify specific branch events that are to be monitored, resulting in other branch events being filtered. However in other embodiments VMM 210 may intercept load CR3 events and identify branch events that are to be monitored. In one embodiment, monitored processes have TF enabled. This may be accomplished by the call and return counters to monitor the number of executed call and return instructions in user mode, respectively, and to trap whenever two such instructions complete. If TF is set, then a #DB exception will occur for every branch.

In one embodiment the counters are reset to prevent a Performance Monitoring Interrupt (PMI) from occurring after the next branch. If a PMI does occur it means that TF is not currently set, and the PMI handler can then set it. This may cause branches to be missed prior to when the PMI occurs for an affected thread. However, tolerances may be put into place to adapt to such a situation in embodiments that implement a ring-0 handler. In embodiments that implement a ring-3 handler, TF can be set by using OS APIs to redirect the execution of each virtual thread to a special routine that sets TF.

Embodiments may feature other approaches, such as virtualizing SYSENTER and SYSEXIT instructions by setting the VMCS field for IA32_SYSENTER_CS to 0, to generate a #GP exception for each invocation of SYSENTER and SYSEXIT. VMM 210 can then clear TF when entering the OS, and set TF when exiting the OS into monitored processes. This process is also useful for avoiding spurious #DB events in the OS. However, TF is not re-enabled when SYSEXIT is resuming a thread in which the handler is active. A partial solution is to check that SYSEXIT is not resuming execution within the handler code region. That is insufficient, since the handler may invoke other libraries. Thus, it is also necessary to maintain a per-thread flag indicating that the handler is active. If that flag is set during a SYSEXIT reentry, then TF should not be enabled. For OSs that do not use SYSENTER and SYSEXIT, different approaches may be required.

In one embodiment, the handler will be invoked for every branch. Thus, a usermode handler should be used when possible. In a further embodiment, a trap gate can be defined in the IDT with a descriptor privilege level of 3, which will direct processor 205 to transfer control to the handler within that process without performing a ring transition. Additionally, VMM 210 can be used to virtualize the IDT, so that such a modification can be made to the #DB descriptor. IDT virtualization is described in U.S. Pat. No. 8,578,080. A modified IDT is defined for each monitored process if it is not possible to place the handler at the same linear address in each. CR3 monitor 214 can intercept load CR3 events and update IDTR to point to an appropriate virtual IDT, or an original IDT for the process being scheduled. Some OSs define a separate IDT for each hardware thread. Thus the IDT virtualization accounts for this by defining corresponding virtual IDTs. The handler can be installed in each MS© Windows© process by injecting a dll.

When switching to a non-monitored process, the original IDT is used. If the OS does not provide a mechanism for notifying a driver of process switches, VMM 210 can be used to handle load CR3 events. VMM 210 can invoke a handler in the driver, which can then update IDT appropriately with possible additional assistance from VMM 210. Further VMM 210 configures counters 206 appropriately. Specifically, the counters 206 are reset to 0 to avoid mixing counts from multiple processes. The handler may check for counter values that are lower than they were during the previous handler invocation to detect this event. A CR3 target list may be used to avoid VM exits that would otherwise occur when switching within a group of processes that are handled similarly. For example, it should be possible to freely switch between unmonitored processes without adjusting the configuration. This is also applicable to monitored processes that all have the handler at the same linear address. In one embodiment, the CR3 target list is a fixed size list of CR3 values that will not cause VM exits when loaded into CR3 by the guest.

Figure 5:
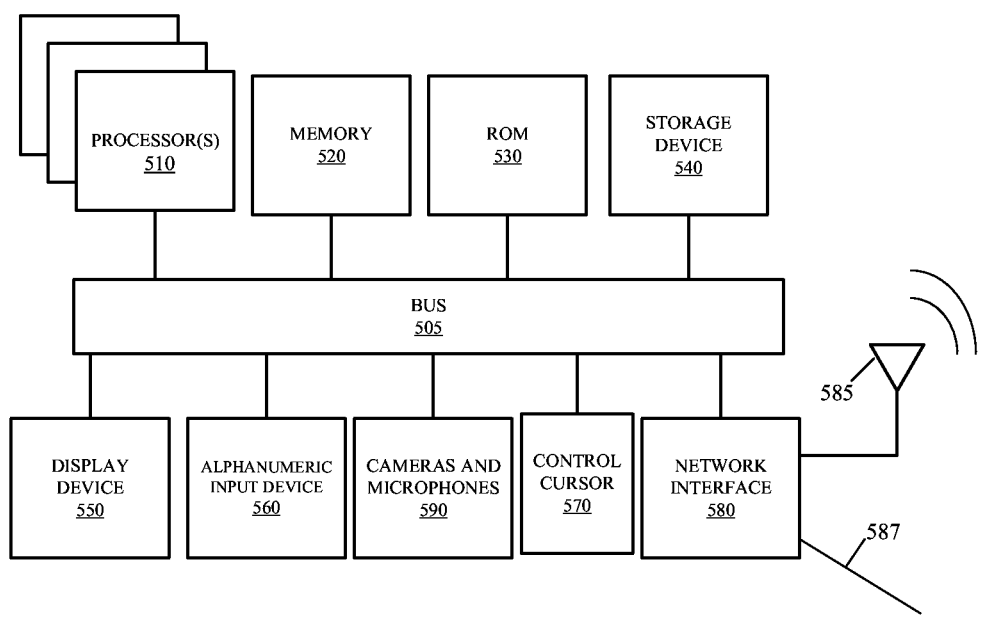
FIG. 5 illustrates computer system suitable for implementing embodiments of the present disclosure.

FIG. 5 illustrates a diagrammatic representation of a computing system 500, such as device 100. Computing system 500 includes bus 505 (or, for example, a link, an interconnect, or another type of communication device or interface to communicate information) and processor 510 coupled to bus 505 that may process information. While computing system 500 is illustrated with a single processor, electronic system 500 and may include multiple processors and/or co-processors, such as one or more of central processors, graphics processors, and physics processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, a touchscreen, a touchpad, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 687, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes a processor including a branch event filter to filter branch trap events, a monitoring component, communicatively coupled to the branch event filter, to monitor the branch event filter to capture indirect branch trap events that cause a control flow trap exception and a handler component to receive and process the indirect branch trap events.

Example 2 includes the subject matter of Example 1, wherein the monitor component communicates with the filter to specify criteria for one more types of branch trap events that are to be captured by the branch event filter.

Example 3 includes the subject matter of Example 2, wherein the monitor component and handler components are protection ring-3 components.

Example 3 includes the subject matter of Example 3, wherein the filter is programmed by the monitor component via a processor model-specific register (MSR) to enable branch trap events.

Example 5 includes the subject matter of Example 2, wherein the monitor component and handler components are protection ring-0 components.

Example 6 includes the subject matter of Example 5, wherein the monitor component configures the branch event filter to capture only mis-predicted return instructions.

Example 7 includes the subject matter of Example 6, wherein the processor further comprises a counter to track predicted return instructions.

Example 8 includes the subject matter of Example 2, wherein the filter captures indirect branch trap events without the processor having to perform a pipeline flush.

Example 9 includes the subject matter of Example 8, further comprising a memory device including a shadow stack not accessible by software, wherein the handler maintains and checks the shadow stack.

Example 10 includes the subject matter of Example 9, wherein the handler accesses the shadow stack during execution of call instructions and return instructions.

Example 11 includes the subject matter of Example 10, wherein the processor further comprises a first counter to enable the branch event filter to track call instructions and a second counter to enable the branch event filter to track return instructions.

Some embodiments pertain to Example 12 that includes a branch event filtering method comprising filtering branch trap events at a branch event filter, monitoring a branch event filter to capture indirect branch trap events that cause a control flow trap exception receiving the indirect branch trap events at a handler and the handler processing the indirect branch trap events.

Example 13 includes the subject matter of Example 12, wherein the indirect branch trap events are captured without the having to perform a processor pipeline flush.

Example 14 includes the subject matter of Example 13, further comprising communicating with the filter to specify criteria for one more types of indirect branch trap events that are to be captured by the branch event filter.

Example 15 includes the subject matter of Example 14, wherein the indirect branch trap events are call instructions and return instructions.

Example 16 includes the subject matter of Example 15, further comprising the handler accessing a shadow stack during execution of the call instructions and return instructions.

Example 17 includes the subject matter of Example 16, further comprising the filter tracking call instructions via a first counter and the filter tracking return instructions via a second counter.

Example 18 includes the subject matter of Example 16, wherein the handler accessing the shadow stack during a call instruction comprises computing a return address for the call instruction and pushing the return address on to the shadow stack.

Example 19 includes the subject matter of Example 18, wherein the handler accessing the shadow stack during a return instruction comprises computing a return address for the return instruction and comparing a return address of the shadow stack to a return address of a legacy stack and popping the return address from the shadow stack upon determining there is a match between return address of the shadow stack and the return address of the legacy stack.

Example 20 includes the subject matter of Example 19, further comprising triggering a shadow stack violation upon determining there is a mismatch between return address of the shadow stack and the return address of the legacy stack.

Some embodiments pertain to Example 21 that includes one or more computer-readable storage media comprising a plurality of instructions that in response to being executed cause a computing device to perform operations comprising filtering branch trap events at a branch event filter, monitoring a branch event filter to capture indirect branch trap events that cause a control flow trap exception, receiving the indirect branch trap events at a handler and the handler processing the indirect branch trap events.

Example 22 includes the subject matter of Example 21, comprising a plurality of instructions that in response to being executed cause the computing device to further perform the handler accessing a shadow stack during execution of call instructions and return instructions.

Example 23 includes the subject matter of Example 22, wherein the handler accessing the shadow stack during a call instruction comprises computing a return address for the call instruction and pushing the return address on to the shadow stack.

Example 24 includes the subject matter of Example 23, wherein the handler accessing the shadow stack during a return instruction comprises computing a return address for the return instruction comparing a return address of the shadow stack to a return address of a legacy stack and popping the return address from the shadow stack upon determining there is a match between return address of the shadow stack and the return address of the legacy stack.

Example 25 includes the subject matter of Example 24, comprising a plurality of instructions that in response to being executed cause the computing device to further perform triggering a shadow stack violation upon determining there is a mismatch between return address of the shadow stack and the return address of the legacy stack.

Some embodiments pertain to Example 26 that includes one or more computer-readable storage media comprising a plurality of instructions that in response to being executed cause a computing device to perform the method of claims 12-20.

Some embodiments pertain to Example 27 that includes a branch event filtering system comprising means for filtering branch trap events at a branch event filter, means for monitoring a branch event filter to capture indirect branch trap events that cause a control flow trap exception, means for receiving the indirect branch trap events at a handler and means for the handler processing the indirect branch trap events.

Example 28 includes the subject matter of Example 27, further comprising means for the handler accessing a shadow stack during execution of the call instructions and return instructions.

Example 29 includes the subject matter of Example 28, wherein the means for handler accessing the shadow stack during a call instruction comprises means for computing a return address for the call instruction and means for pushing the return address on to the shadow stack.

Example 30 includes the subject matter of Example 29, wherein the means for the handler accessing the shadow stack during a return instruction comprises means for computing a return address for the return instruction, means for comparing a return address of the shadow stack to a return address of a legacy stack and means for popping the return address from the shadow stack upon determining there is a match between return address of the shadow stack and the return address of the legacy stack.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The invention claimed is:

1. A computing device for branch event filtering comprising:
   a processor including a branch event filter to filter branch trap events of a process;
   a monitoring component, communicatively coupled to the branch event filter, to monitor the branch event filter and to capture indirect branch trap events of the process that cause a control flow trap exception; and
   a handler component to receive and process the indirect branch trap events.

2. The computing device of claim 1 wherein the monitoring component communicates with the branch event filter to specify criteria for one more types of branch trap events that are to be captured by the branch event filter.

3. The computing device of claim 2 wherein the monitor component and the handler component are protection ring-3 components.

4. The computing device of claim 3 wherein the branch event filter is programmed by the monitoring component via a processor model-specific register (MSR) to enable branch trap events.

5. The computing device of claim 2 wherein the monitoring component and the handler component are protection ring-0 components.

6. The computing device of claim 5 wherein the monitoring component configures the branch event filter to capture only mis-predicted return instructions.

7. The computing device of claim 6 wherein the processor further comprises a counter to track predicted return instructions.

8. The computing device of claim 2 wherein the branch event filter captures indirect branch trap events without the processor having to perform a pipeline flush.

9. The computing device of claim 8 further comprising a memory device including a shadow stack not accessible by software, wherein the handler component maintains and checks the shadow stack.

10. The computing device of claim 9 wherein the handler component accesses the shadow stack during execution of call instructions and return instructions.

11. The computing device of claim 10 wherein the processor further comprises:
a first counter to enable the branch event filter to track call instructions; and
a second counter to enable the branch event filter to track return instructions.

12. A branch event filtering method for a processor comprising:
filtering branch trap events of a process by a branch event filter;
monitoring the branch event filter to capture indirect branch trap events of the process that cause a control flow trap exception;
receiving the indirect branch trap events at a handler; and
processing the indirect branch trap events by the handler.

13. The method of claim 12 wherein the indirect branch trap events are captured without the having to perform a processor pipeline flush.

14. The method of claim 13 further comprising communicating with the branch event filter to specify criteria for one more types of indirect branch trap events that are to be captured by the branch event filter.

15. The method of claim 14 wherein the indirect branch trap events are call instructions and return instructions.

16. The method of claim 15 further comprising accessing a shadow stack during execution of the call instructions and return instructions by the handler component.

17. The method of claim 16 further comprising:
tracking call instructions via a first counter by the branch event filter; and
tracking return instructions via a second counter by the branch event filter.

18. The method of claim 16 wherein accessing the shadow stack during a call instruction by the handler component comprises:
computing a return address for the call instruction; and
pushing the return address on to the shadow stack.

19. The method of claim 18 wherein accessing the shadow stack during a return instruction by the handler component comprises:
computing a return address for the return instruction;
comparing a return address of the shadow stack to a return address of a legacy stack; and
popping the return address from the shadow stack upon determining there is a match between return address of the shadow stack and the return address of the legacy stack.

20. The method of claim 19 further comprising triggering a shadow stack violation upon determining there is a mismatch between return address of the shadow stack and the return address of the legacy stack.

21. One or more non-transitory computer-readable storage media comprising a plurality of instructions that in response to being executed cause a computing device to perform operations comprising:
filtering branch trap events of a process by a branch event filter;
monitoring the branch event filter to capture indirect branch trap events of the process that cause a control flow trap exception;
receiving the indirect branch trap events at a handler; and
processing the indirect branch trap events by the handler.

22. The computer-readable storage media of claim 21 comprising a plurality of instructions that in response to being executed cause the computing device to further perform accessing a shadow stack during execution of call instructions and return instructions by the handler.

23. The computer-readable storage media of claim 22 wherein accessing the shadow stack during a call instruction by the handler comprises:
computing a return address for the call instruction; and
pushing the return address on to the shadow stack.

24. The computer-readable storage media of claim 23 wherein accessing the shadow stack during a return instruction by the handler comprises:
computing a return address for the return instruction;
comparing a return address of the shadow stack to a return address of a legacy stack; and
popping the return address from the shadow stack upon determining there is a match between return address of the shadow stack and the return address of the legacy stack.

25. The computer-readable storage media of claim 24 comprising a plurality of instructions that in response to being executed cause the computing device to further perform triggering a shadow stack violation upon determining there is a mismatch between return address of the shadow stack and the return address of the legacy stack.

* * * * *